United States Patent [19]

Gray et al.

[11] Patent Number: 5,611,603
[45] Date of Patent: Mar. 18, 1997

[54] SEAT BELT RETRACTOR

[75] Inventors: Mark F. Gray, Attica; Robert A. Frantz, Bloomfield Hills, both of Mich.

[73] Assignee: TRW Vehicle Safety Systems Inc., Lyndhurst, Ohio

[21] Appl. No.: 248,518

[22] Filed: May 24, 1994

[51] Int. Cl.$^6$ .................................................. B60R 21/00
[52] U.S. Cl. ...................... 297/476; 297/238; 242/378.4; 242/382.2
[58] Field of Search .................................... 297/474–476, 297/478, 480, 484, 238, 250.1; 242/378.4, 382.2

[56] References Cited

U.S. PATENT DOCUMENTS

| | | |
|---|---|---|
| 2,557,313 | 6/1951 | Quilter . |
| 2,825,581 | 3/1958 | Knight . |
| 3,241,883 | 3/1966 | Fontaine . |
| 3,910,634 | 10/1975 | Morris . |
| 4,164,336 | 8/1979 | Higbee et al. . |
| 4,342,483 | 8/1982 | Takada . |
| 4,396,167 | 8/1983 | Loose ................................ 242/378.4 X |
| 4,420,127 | 12/1983 | Kondziola et al. ................... 242/378.4 |
| 4,427,163 | 1/1984 | Kondziola ........................ 242/378.4 X |
| 4,688,849 | 8/1987 | Tsuge et al. . |
| 4,896,844 | 1/1990 | Garagan et al. ................... 242/378.4 X |
| 5,061,012 | 10/1991 | Parker et al. . |
| 5,123,673 | 6/1992 | Tame . |
| 5,286,084 | 2/1994 | Bart ........................................ 297/238 |

*Primary Examiner*—Milton Nelson, Jr.
*Attorney, Agent, or Firm*—Tarolli, Sundheim, Covell, Tummino & Szabo

[57] ABSTRACT

A retractor (24) for seat belt webbing (22) includes a first spool (60) for a first wound length of seat belt webbing (30) and a second spool (62) for a second wound length of seat belt webbing (32). The first and second spools (60, 62) are supported for winding and unwinding rotation. The retractor (24) further includes a cinch mechanism (110). The cinch mechanism (110) blocks unwinding rotation of the first spool (60) in response to a first amount of rotation of the spools (60, 62) which includes a predetermined amount of unwinding rotation of the second spool (62). The cinch mechanism (110) blocks unwinding rotation of the second spool (62) in response to a second amount of rotation of the spools (60, 62) which includes a predetermined amount of unwinding rotation of the first spool (60).

38 Claims, 6 Drawing Sheets

SEAT BELT RETRACTOR

FIELD OF THE INVENTION

The present invention relates to a retractor for seat belt webbing.

BACKGROUND OF THE INVENTION

A seat belt system for restraining an occupant of a vehicle ordinarily includes seat belt webbing, a seat belt buckle and a seat belt retractor. A locking tongue is connected to the webbing and is releasably lockable in the buckle when the webbing is extended around the vehicle occupant. The retractor includes a spool upon which the webbing is wound. The spool rotates in an unwinding direction when the vehicle occupant extracts the webbing from the retractor and moves the webbing toward the extended position in which the tongue is locked in the buckle. When the tongue is subsequently unlocked and released from the buckle, a rewind spring in the retractor rotates the spool in a winding direction to retract the webbing back into the retractor.

When the vehicle experiences a collision, the vehicle decelerates and the vehicle occupant wearing the seat belt webbing moves forcefully against the webbing. The force which is then applied to the webbing by the vehicle occupant urges the webbing to move outward from the retractor. Therefore, the retractor includes a locking mechanism which operates to block rotation of the spool in the unwinding direction. The locking mechanism thus operates to prevent the webbing from being further extracted from the retractor when the vehicle experiences a collision.

In some seat belt systems, the webbing is prevented from being further extracted from the retractor throughout the time that the webbing is secured around the vehicle occupant, i.e., the webbing is maintained in a cinched condition. For example, some child seat belt systems maintain the webbing in a cinched condition.

SUMMARY OF THE INVENTION

In accordance with the present invention, a seat belt retractor comprises a first spool and a second spool. The first spool has a means for supporting a first wound length of seat belt webbing, and is supported for winding and unwinding rotation. The second spool has a means for supporting a second wound length of seat belt webbing, and also is supported for winding and unwinding rotation.

The retractor further comprises a cinch means for blocking unwinding rotation of the spools. The cinch means blocks unwinding rotation of the first spool in response to a first amount of rotation of the spools. The first amount of rotation of the spools includes a predetermined amount of unwinding rotation of the second spool. The cinch means blocks unwinding rotation of the second spool in response to a second amount of rotation of the spools. The second amount of rotation of the spools includes a predetermined amount of unwinding rotation of the first spool.

In a preferred embodiment of the present invention, the cinch means blocks unwinding rotation of each of the two spools only after both spools have rotated a predetermined amount in the unwinding direction upon extraction of the two sections of webbing from initial, fully retracted positions. The retractor thus enables a vehicle occupant to make repeated extracting and retracting movements of the first and second sections of webbing when handling the webbing before both sections are locked in a seat belt buckle. This is because neither of the two sections of webbing is cinched until after both spools have been rotated a predetermined amount in the unwinding direction.

BRIEF DESCRIPTION OF THE DRAWINGS

The foregoing and other features of the present invention will become apparent to one skilled in the art to which the present invention relates upon reading the following description with reference to the accompanying drawings, in which.

DESCRIPTION OF A PREFERRED EMBODIMENT

Figure 1:
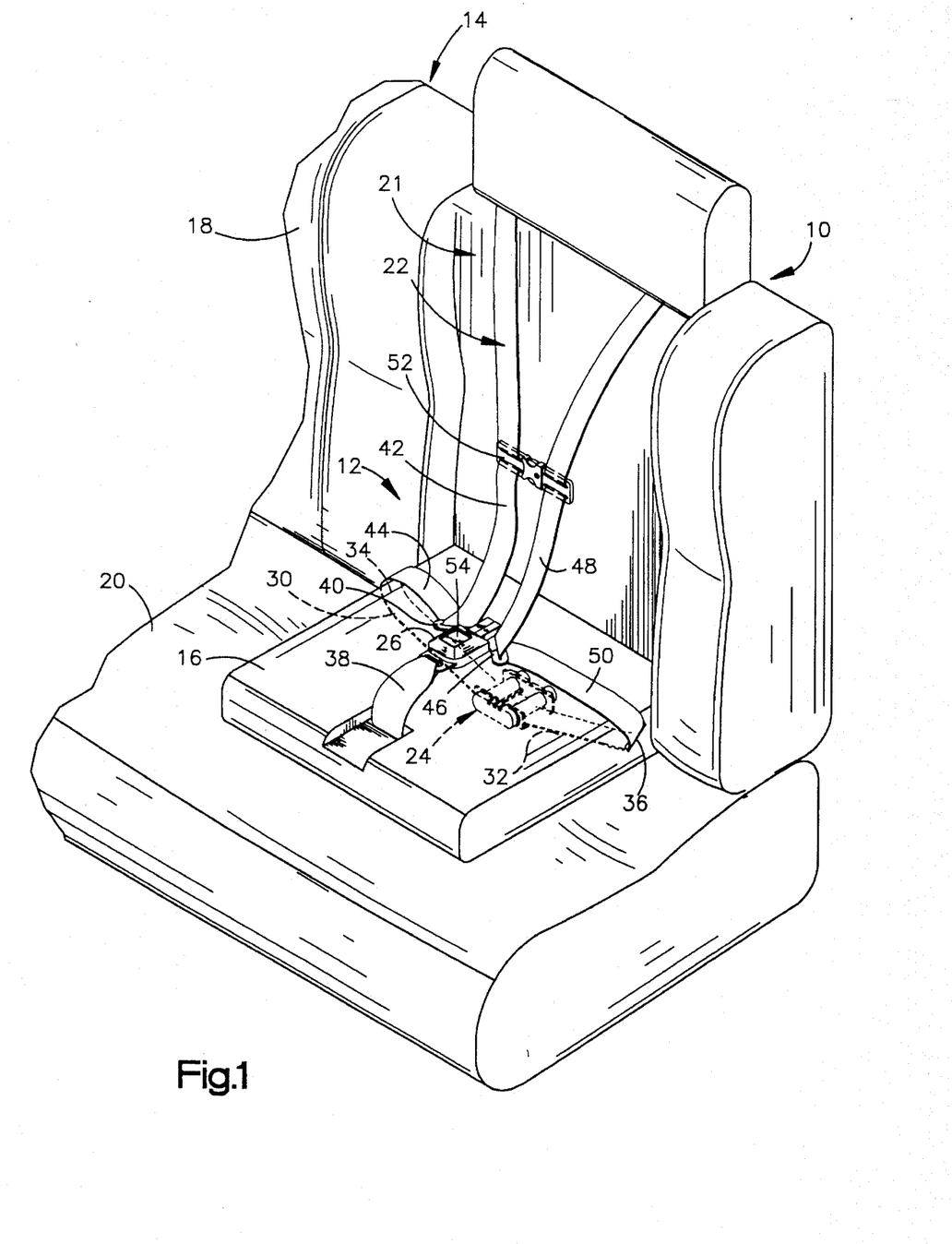
FIG. 1 is a view of a seat belt system comprising a preferred embodiment of the present invention.

A seat belt system 10 comprising a preferred embodiment of the present invention is shown in FIG. 1. The seat belt system 10 is a child restraint system for a child seat 12. The child seat 12 is a portion of a vehicle seat 14, and includes a child seat cushion 16. The child seat cushion 16 is formed as a panel which pivots downward from the back 18 of the seat 14 onto the cushion 20 of the seat 14, as shown in FIG. 1. When the child seat cushion 16 is in the position of FIG. 1, a recessed portion 21 of the back 18 of the seat 14 defines the back of the child seat 12. The seat belt system 10 includes seat belt webbing 22, a retractor 24, and a buckle 26.

The retractor 24 is mounted in the child seat cushion 16 near the rear, pivoted end of the cushion 16. The seat belt webbing 22 has several distinct sections, including first and second sections 30 and 32 which extend from the retractor 24. The first section 30 of the webbing 22 extends from the retractor 24 to an opening 34 at one side of the child seat cushion 16, and further extends through the opening 34 and upward to a location at which it is fixed to the back 18 of the seat 14. The second section 32 of the webbing 22 similarly extends from the retractor 24 to an opening 36 at the other side of the child seat cushion 16, through the opening 36, and upward to a location at which it is fixed to the back 18 of the seat 14. A third section 38 of the webbing 22 anchors the buckle 26 to the child seat panel 16 near the forward end of the panel 16.

A first locking tongue 40 is connected with the first section 30 of the webbing 22. The first locking tongue 40 is slidable along the length of the first section 30, and is releasably lockable in the buckle 26. When the first locking tongue 40 is locked in the buckle 26, it defines a shoulder belt portion 42 and a lap belt portion 44 of the first section 30 of the webbing 22.

A second locking tongue 46 is connected with the second section 32 of the webbing 22. When locked in the buckle 26, the second locking tongue 46 defines shoulder and lap belt portions 48 and 50 of the second section 30. An adjustment member 52 is connected with the shoulder belt portions 42 and 48 of the first and second sections 30 and 32 of the webbing 22. The adjustment member 52 adjusts and locates the shoulder belt portions 42 and 48 relative to a seated child in a known manner. Both of the tongues 40 and 46 are unlocked and released from the buckle 26 upon manual depression of a release button 54 on the buckle 26.

Figure 2:
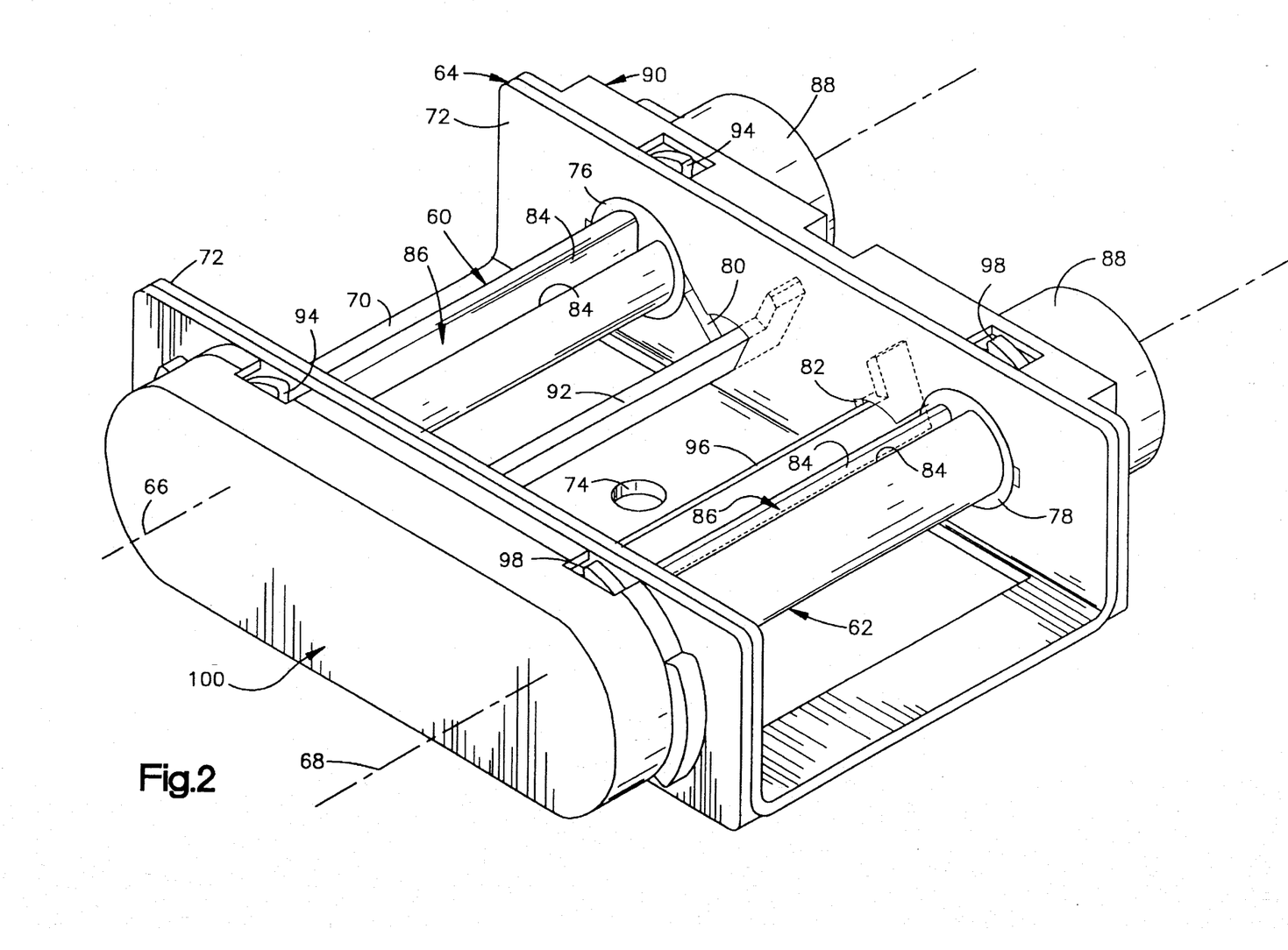
FIG. 2 is a view of a seat belt retractor which is shown in FIG. 1.

The retractor 24 is shown in detail in FIG. 2 without the first and second sections 30 and 32 of the webbing 22. The retractor 24 includes a first spool 60 for the first section 30 of the webbing 22, and includes a second spool 62 for the second section 32 of the webbing 22. The first and second spools 60 and 62 are supported on a frame 64 for rotation about first and second axes 66 and 68, respectively. The frame 64 is a channel-shaped part with a base wall 70 and a pair of parallel opposite side walls 72. A cylindrical inner surface 74 of the base wall 70 defines an opening which receives a fastener (not shown) for fastening the frame 64 to the child seat panel 16 (FIG. 1).

The first and second spools 60 and 62 have hubs at their opposite ends. The first spool 60 thus has a pair of hubs 76, one of which is shown at the end of the first spool 60 that is visible in FIG. 2. The second spool 62 has a pair of hubs 78, one of which also is shown in FIG. 2. Each of the side walls 72 of the frame 64 has a first inner edge surface 80 and a second inner edge surface 82. The first inner edge surfaces 80, one of which is shown in FIG. 2, have annular portions which support the hubs 76 at the opposite ends of the first spool 60. The second inner edge surfaces 82 have annular portions that support the hubs 78 at the opposite ends of the second spool 62.

Each of the spools 60 and 62 further has a pair of opposed inner surfaces 84 which define a slot 86 extending diametrically through the respective spool 60 or 62. The first and second spools 60 and 62 are thus constructed to engage and retain respective end portions of the first and second sections 30 and 32 of the webbing 22. The first section 30 of the webbing 22 is wound onto the first spool 60 upon counterclockwise rotation of the first spool 60, and is unwound from the first spool 60 upon clockwise rotation of the first spool 60, with those directions being taken as viewed in FIG. 2. In an opposite manner, the second section 32 of the webbing 22 is wound onto the second spool 62 upon clockwise rotation of the second spool 62, and is unwound from the second spool 62 upon counterclockwise rotation of the second spool 62, as viewed in FIG. 2. A pair of rewind springs (not shown) bias the spools 60 and 62 to rotate in their respective winding directions. The rewind springs are constructed as known in the art, and are contained in cylindrical portions 88 of a spring cover 90 which is mounted on a side wall 72 at one side of the frame 64.

As further shown in FIG. 2, the first inner edge surfaces 80 of the side walls 72 of the frame 64 also support a first locking pawl 92. The first locking pawl 92 extends across the frame 64 adjacent to the first spool 60, and is supported for pivotal movement into and out of a locked position. When the first locking pawl 92 is in its locked position, it extends into the rotational path of movement of ratchet teeth 94 at the opposite ends of the first spool 60, and thus blocks unwinding rotation of the first spool 60. The second inner edge surfaces 82 of the side walls 72 likewise support a second locking pawl 96 for pivotal movement into and out of a locked position in which it engages ratchet teeth 98 on the second spool 62 to block unwinding rotation of the second spool 62.

A cinch mechanism cover 100 is mounted opposite to the spring cover 90 on the other side wall 72 of the frame 64, as shown in FIG. 2. The cinch mechanism cover 100 encloses a cinch mechanism 110, which is shown in FIGS. 3–8. The cinch mechanism 110 operates to move the locking pawls 92 and 96 into and out of their locked positions in response to rotation of the spools 60 and 62.

Figure 3:
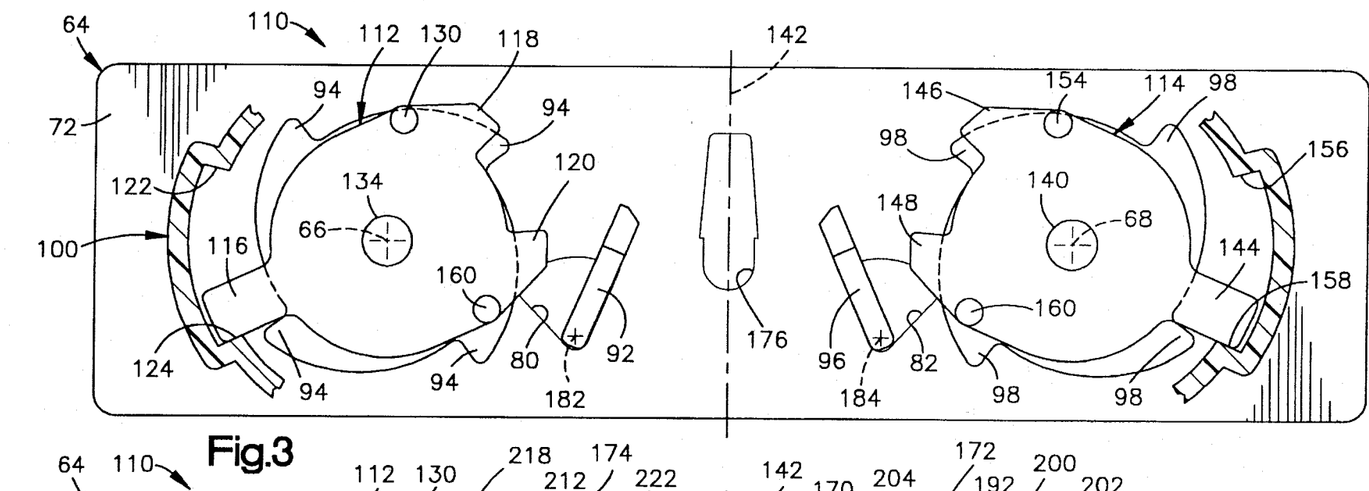
FIG. 3 is a view of parts of the retractor of FIG. 2.

As shown partially in FIG. 3, the cinch mechanism 110 includes a first clutch disk 112 and a second clutch disk 114. The first clutch disk 112 has a radially projecting arm 116 and two radially projecting lugs 118 and 120. The arm 116 is located between two circumferentially spaced stop surfaces 122 and 124 on the cover 100. The first clutch disk 112 further has an upper clutch pin 130 which projects axially outward at a location adjacent to the upper lug 118.

A stub shaft portion 134 of the first spool 60 supports the first clutch disk 112 for rotation about the first axis 66 with the first spool 60. Such rotation of the first clutch disk 112 in the clockwise and counterclockwise directions, as viewed in FIG. 3, is limited upon contact of the arm 116 with the stop surfaces 122 and 124, respectively. When rotational movement of the arm 116 is stopped by one of the stop surfaces 122 or 124, the first spool 60 can continue to rotate relative to the first clutch disk 112 in either direction.

The second clutch disk 114 is similarly supported on a stub shaft portion 140 of the second spool 62 for rotation about the second axis 68 with the second spool 62. In comparison to the first clutch disk 112, the orientation of the second clutch disk 114 is reversed relative to a center line 142 of the frame 64. However, the structure of the second clutch disk 114 is the same as the structure of the first clutch disk 112. The second clutch disk 114 thus has a radially projecting arm 144, upper and lower lugs 146 and 148, and an upper clutch pin 154 projecting axially outward at a location adjacent to the upper lug 146. Like the stop surfaces 122 and 124 associated with the first clutch disk 112, another pair of stop surfaces 156 and 158 on the cover 100 define the upper and lower limits of movement of the arm 144 upon rotation of the second clutch disk 114 about the second axis 68 with the second spool 62. Each of the two clutch disks 112 and 114 further has a lower clutch pin 160. The lower clutch pins 160 are merely incidental results of forming the two clutch disks 112 and 114 with identical structures and mounting them with reversed orientations.

Figure 4:
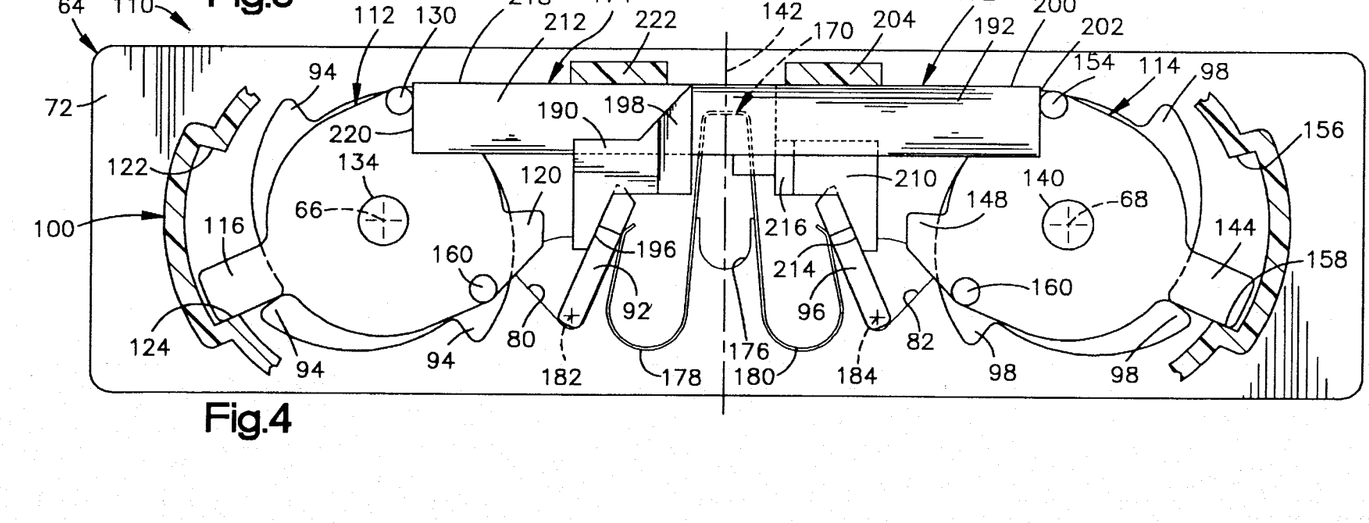
FIG. 4 is a view similar to FIG. 3 showing other parts of the retractor of FIG. 2.

Other parts of the cinch mechanism 110 are shown in FIG. 4. These other parts include a spring 170, a first link 172, and a second link 174. The spring 170 is received in an opening defined by an inner edge surface 176 of the adjacent side wall 72 of the frame 64, and has first and second U-shaped spring arms 178 and 180. The first spring arm 178 acts directly on the first locking pawl 92, and biases the first locking pawl 92 to pivot about a first pivot axis 182 in a counterclockwise direction, as viewed in FIG. 4. The first spring arm 178 thus biases the first locking pawl 92 toward its locked position. The second spring arm 180 acts directly on the second locking pawl 96, and biases the second locking pawl 96 to pivot about a second pivot axis 184 in a clockwise direction, as viewed in FIG. 4. The second spring arm 180 thus biases the second locking pawl 96 toward its locked position.

The first and second links 172 and 174 have elongated shapes, and are supported for longitudinal sliding movement across the center line 142 in directions perpendicular to the center line 142. The first link 172 has a first end portion 190 and a second end portion 192. The first end portion 190 has an inclined lower edge surface 196 which rests against the first locking pawl 92. An abutment wall portion 198 of the first link 172 projects axially outward from the first end portion 190. (As used herein, the term "axially" means in a direction parallel, or generally parallel, to the first and second axes 66 and 68. The terms "outward" and "inward" respectively refer to directions away from and toward the side wall 72 adjacent to the cinch mechanism 110.) The second end portion 192 of the first link 172 has an upper edge surface 200 and an end surface 202. A tab portion 204 of the cover 100 projects axially inward over the upper edge surface 200 of the first link 172. The tab portion 204 of the cover 100 serves as a guide for sliding movement of the first link 172. When the first link 172 is in the position shown in FIG. 4, the end surface 202 of the first link 172 abuts the upper clutch pin 154 on the second clutch disk 114.

The second link 174 also has a first end portion 210 and a second end portion 212. An inclined lower edge surface 214 of the first end portion 210 rests against the second locking pawl 96. An abutment wall portion 216 of the second link 174 projects axially outward from the first end portion 210. The second end portion 212 of the second link 174 has an upper edge surface 218 and an end surface 220. Another tab portion 222 of the cover 100 extends axially inward over the upper edge surface 218, and serves as a guide for sliding movement of the second link 174. When the second link 174 is in the position shown in FIG. 4, the end surface 220 abuts the upper clutch pin 130 on the first clutch disk 112.

Figure 5:
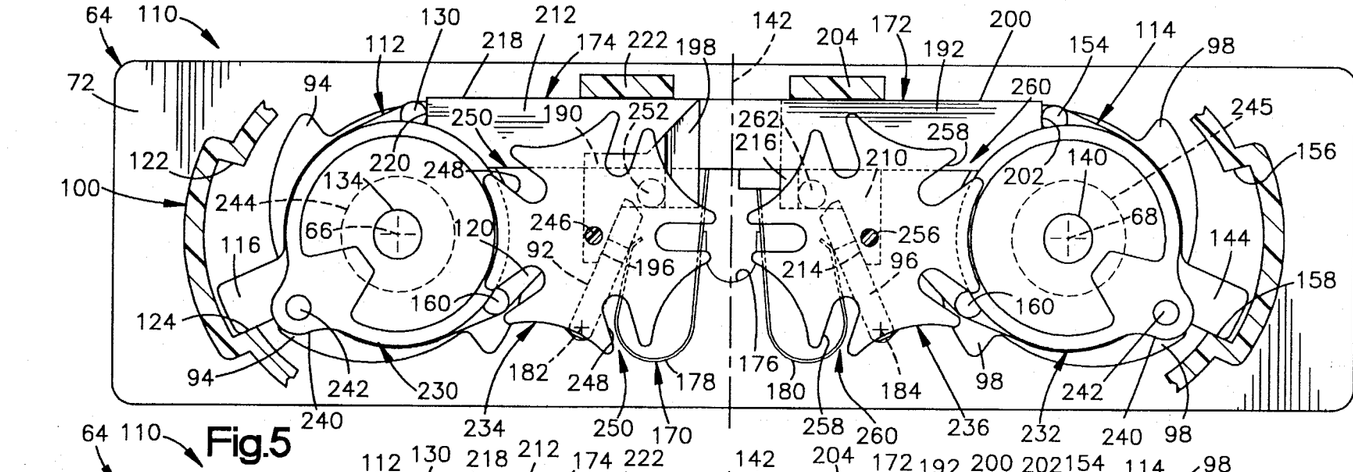
FIG. 5 is a view similar to FIG. 4 showing additional parts of the retractor of FIG. 2.

Additional parts of the cinch mechanism 110 are shown in FIG. 5. These additional parts include first and second count disks 230 and 232, and first and second count wheels 234 and 236. The first and second count disks 230 and 232 are received on the stub shafts 134 and 140, and are located axially outward of the first and second clutch disks 112 and 114, respectively. Moreover, the first and second count disks 230 and 232 are fixed to the stub shafts 134 and 140, and are thus constrained to rotate about the first and second axes 66 and 68 with the first and second spools 60 and 62, respectively. Each of the count disks 230 and 232 has a radially projecting portion 240 which supports a respective count pin 242 that projects axially outward.

A first disk spring 244 (FIG. 5) acts axially between the first count disk 230 and the first clutch disk 112. The first disk spring 244 biases the first clutch disk 112 in a direction axially inward from the first count disk 230, and thus biases the first clutch disk 112 into frictional engagement with the adjacent end of the first spool 60. Such frictional engagement causes the first clutch disk 112 to rotate with the first spool 60 throughout the range of movement defined by the stop surfaces 122 and 124 on the cover 100, but enables the first spool 60 to rotate relative to the first clutch disk 112 after rotation of the first clutch disk 112 is stopped by contact of the arm 116 with one of the stop surfaces 122 and 124, as described briefly above. A second disk spring 245 acts axially between the second count disk 232 and the second clutch disk 114 in the same manner. The second disk spring 245 thus causes the second clutch disk 114 and the second spool 62 to rotate with each other and relative to each other, as described above.

The first count wheel 234 is supported for rotation on a hub 246. The hub 246 is a portion of the cover 100 which extends axially inward at a location between the center line 142 of the frame 64 and the axis 66 of the first spool 60. A plurality of U-shaped inner edge surfaces 248 of the first count wheel 234 define a plurality of slots 250 which extend radially inward from the periphery of the first count wheel 234. A first abutment pin 252 projects axially inward from the side of the first count wheel 234 that faces toward the adjacent side wall 72 of the frame 64.

The second count wheel 236 is similarly supported for rotation on a hub 256 which is defined by the cover 100 at a location between the center line 142 and the axis 68 of the second spool 62. Each one of a plurality of U-shaped inner edge surfaces 258 of the second count wheel 236 defines a respective slot 260 which extends radially inward from the periphery of the second count wheel 236. A second abutment pin 262 projects axially inward from the side of the second count wheel 236 that faces toward the adjacent side wall 72 of the frame 64.

When the first and second sections 30 and 32 of the webbing 22 (FIG. 1) are fully retracted into the retractor 24, they have maximum length portions wound onto the first and second spools 60 and 62 (FIG. 2), respectively. The cinch mechanism 110 then has an initial condition, and the parts of the cinch mechanism 110 described above are located in the positions in which they are shown in FIGS. 3–5.

As shown in FIG. 5, the first abutment pin 252 on the first count wheel 234 is located in abutting engagement with the abutment wall portion 198 of the first link 172. The first count wheel 234 thus holds the first link 172 in the position shown in FIG. 5, with the end surface 202 of the first link 172 abutting the upper clutch pin 154 on the second clutch disk 114. The first link 172, in turn, holds the first locking pawl 92 in the position shown in FIG. 5 against the bias of the first spring arm 178, with the lower edge surface 196 of the first link 172 blocking movement of the first locking pawl 92. In the same manner, the second abutment pin 262 on the second count wheel 236 engages the abutment wall portion 216 of the second link 174 to hold the end surface 220 of the second link 174 against the upper clutch pin 130 on the first clutch disk 112. The lower edge surface 214 of the second link 174 is held against the second locking pawl 96 and, as a result, the second link 174 holds the second locking pawl 96 in the position shown in FIG. 5 against the bias of the second spring arm 180. The two locking pawls 92 and 96 are thus held in initial positions that are spaced from their locked positions, and the two spools 60 and 62 are free to rotate in their unwinding directions.

Figure 7:
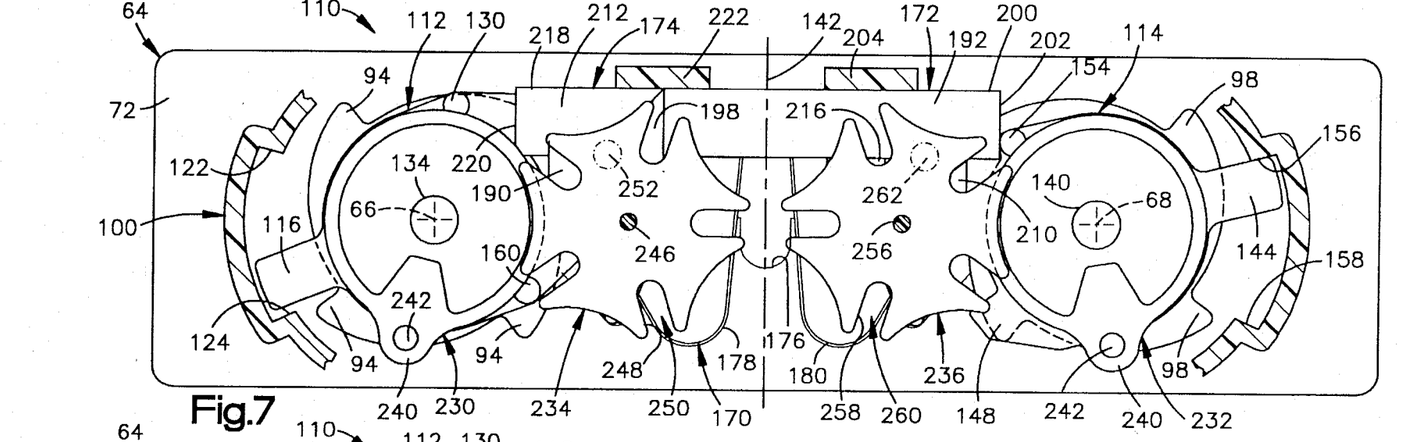
FIG. 7 is a view similar to FIG. 6 showing parts of the retractor in positions taken at a different stage of operation of the retractor.
Figure 8:
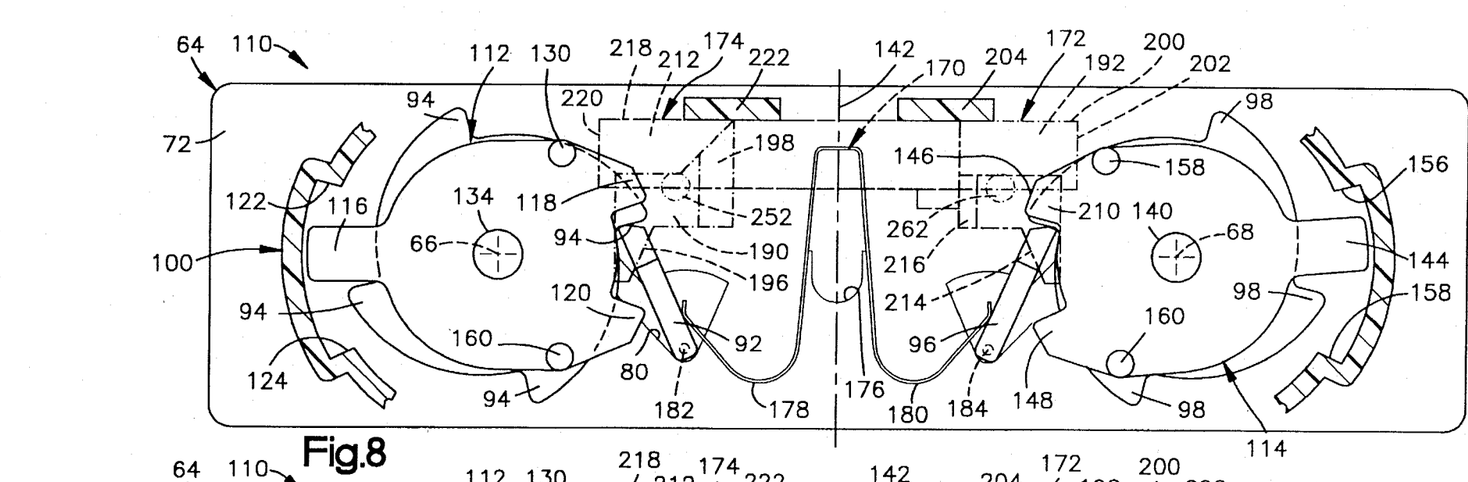
FIG. 8 is a view similar to FIG. 6 showing parts of the retractor in positions taken at another stage of operation of the retractor.

When the first and second sections 30 and 32 of the webbing 22 are extracted from the retractor 24 and moved toward the positions shown in FIG. 1, the first and second spools 60 and 62 are rotated in their unwinding directions. As an example of the manner in which the cinch mechanism 110 operates, FIGS. 6–8 illustrate successive stages in the operation of the cinch mechanism 110 upon extraction of the first section 30 of the webbing 22 followed by extraction of the second section 32.

When the first section 30 of the webbing 22 is extracted from the retractor 24, the first spool 60 rotates in its unwinding direction, which is clockwise as viewed in the drawings. The first count disk 230, which is constrained to rotate with the first spool 60, also rotates in the clockwise direction. Each time the first count disk 230 rotates about the first axis 66, the count pin 242 on the first count disk 230 moves against the first count wheel 234 to rotate the first count wheel 234 an incremental amount in the counterclockwise direction. Specifically, each time the count pin 242 on the first count disk 230 moves downward past the first count wheel 234, it enters one of the slots 250 and pushes the respective inner edge surface 248 downward until the count pin 242 emerges from the slot 250. As the first count wheel 234 is thus rotated in the counterclockwise direction, the first abutment pin 252 on the first count wheel 234 moves to the left from the position shown in FIG. 5. When at least a predetermined amount of unwinding rotation of the first spool 60 has been completed, the first abutment pin 252 will have reached the position shown in FIG. 6. Such movement of the first abutment pin 252 releases the abutment wall portion 198 of the first link 172 to move to the left from the position shown in FIG. 5. The first link 172 is then moved to the left from the position of FIG. 5 under the influence of the first spring arm 178, because the first spring arm 178 urges the first locking pawl 92 against the lower edge surface 196 of the first link 172 in that direction. Therefore, as a result of extraction of the first section 30 of the webbing 22, the first locking pawl 92 is moved pivotally about the first pivot axis 182 from the initial position of FIG. 5 to an intermediate position, as shown in FIG. 6A. When the first locking pawl 92 reaches the intermediate position of FIG. 6A, the lower lug 120 on the first clutch disk 112 blocks further movement of the first locking pawl 92 toward its locked position.

Figure 6:
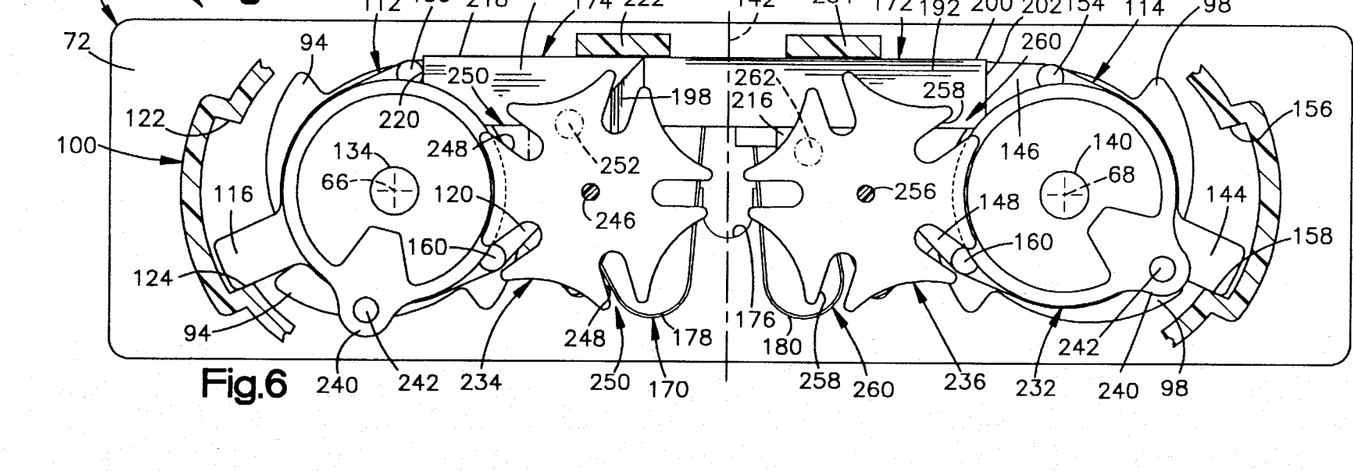
FIG. 6 is a view similar to FIG. 5 showing parts of the retractor in positions taken at one stage of operation of the retractor.
Figure 6A:
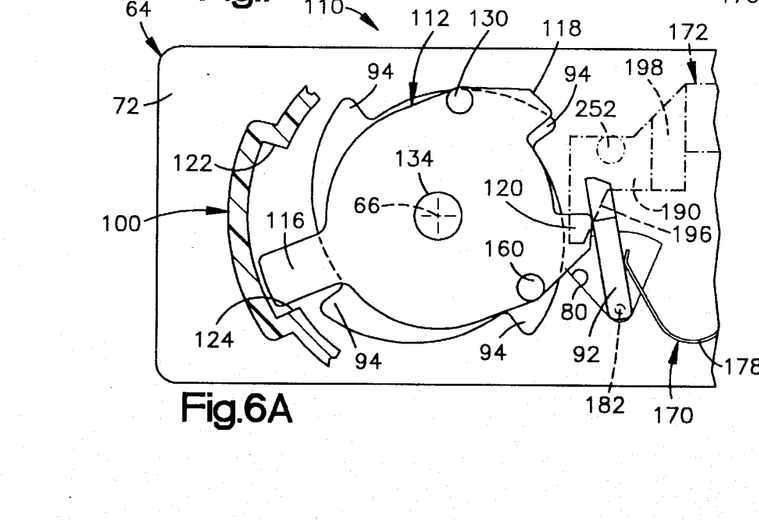
FIG. 6A is a view similar to FIG. 6, with certain parts omitted for clarity of illustration.

As further shown in FIG. 6, movement of the first link 172 to the left in the foregoing manner causes the end surface 202 of the first link 172 to move away from the upper clutch pin 154 on the second clutch disk 114. The second clutch disk 114 is then free to rotate in the counterclockwise direction. Therefore, as an additional result of extraction of the first section 30 of the webbing 22, the first link 172 enables the second clutch disk 114 to rotate with the second spool 62 upon subsequent unwinding rotation of the second spool 62 when the second section 32 of the webbing 22 also is extracted from the retractor 24.

Figure 7A:
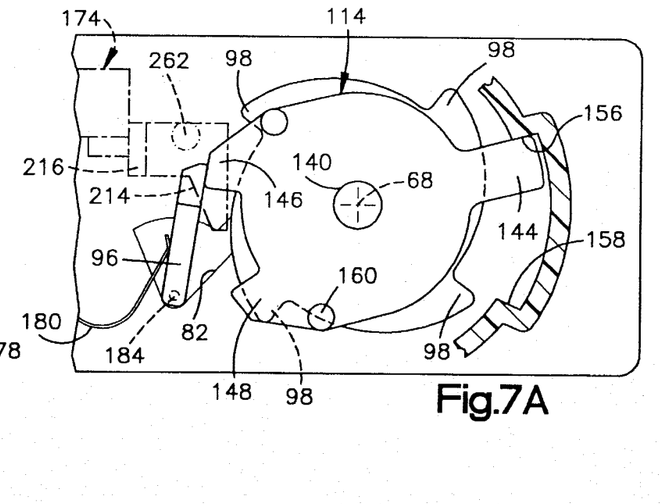
FIG. 7A is a view similar to FIG. 7, with certain parts omitted for clarity of illustration.

When the second section 32 of the webbing 22 is extracted from the retractor 24 following extraction of the first section 30, the second clutch disk 114 rotates with the second spool 62 in the counterclockwise direction from the position of FIG. 6 until the upper stop surface 156 on the cover 100 blocks further upward movement of the arm 144 on the second clutch disk 114. The second clutch disk 114 thus rotates in the counterclockwise direction from the position shown in FIG. 6 to the position shown in FIGS. 7 and 7A. The upper lug 146 on the first clutch disk 114 is thus moved into the path of movement of the second locking pawl 96, as shown in FIG. 7A. The second count disk 232 also rotates in the counterclockwise direction with the second spool 62, and thus rotates the second count wheel 236 oppositely in the clockwise direction. Such rotation of the second count wheel 236 is effected by the second count disk 232 in the same manner as described above with reference to the first count wheel 234 and the first count disk 230. When at least a predetermined amount of unwinding rotation of the second spool 62 has been completed, the second count wheel 236 will have rotated from the position of FIG. 6 to the position of FIG. 7. The second abutment pin 262 on the second count wheel 236 has then moved away from the abutment wall portion 216 of the second link 174 and permits the abutment wall portion 216 to move to the right from the position of FIG. 6 to the position of FIG. 7A. The second link 174 is moved in that direction by the force of the second spring arm 180 acting against the second locking pawl 96 and the lower edge surface 214 of the second link 174. As a result, the second locking pawl 96 is moved from its initial position to an intermediate position in which it rests against the upper lug 146 on the second clutch disk 114, as shown in FIG. 7A. Additionally, the end surface 220 of the second link 174 is moved away from the upper clutch pin 130 on the first clutch disk 112 when the second link 174 moves to the right, as shown in FIG. 7. Rotation of the first clutch disk 112 with the first spool 60 is thus enabled by the second link 174 upon extraction of the second section 32 of the webbing 22 from the retractor 24.

When each of the two sections 30 and 32 of the webbing 22 is extracted from the retractor 24 as described above, each of the two locking tongues 40 and 46 can be locked in the buckle 26, as shown in FIG. 1. The cinch mechanism 110 then has the intermediate condition shown in FIG. 7. When the tongues 40 and 46 have been locked in the buckle 26, the cinch mechanism 110 holds the webbing 22 securely in place around a seated child by preventing further extraction of the first and second sections 30 and 32 of the webbing 22. The cinch mechanism 110 operates to prevent such further extraction of the webbing 22 by shifting from the intermediate condition of FIG. 7 to the cinched condition of FIG. 8 in the following manner.

As shown in FIG. 7, the lower lug 120 on the first clutch disk 112 blocks further pivotal movement of the first locking pawl 92 to the left under the influence of the first spring arm 178. However, a seated child wearing the webbing 22, or another vehicle occupant attending to the seated child, will move the first section 30 a slight amount upon locking the first tongue 40 in the buckle 26. Such movement of the first section 30 will include slight additional amounts of both retraction and extraction, and will thus cause a slight amount of additional unwinding rotation of the first spool 60. The first clutch disk 112 then rotates with the first spool 60 in the clockwise direction from the position of FIG. 7 to the position of FIG. 8, and the lower lug 120 moves away from the locking pawl 92 in the clockwise direction. The first clutch disk 112 thus directs the first locking pawl 92 to move pivotally into the space between the upper and lower lugs 118 and 120. The first locking pawl 92 is then located in the locked position in which it blocks further movement of the ratchet teeth 94, and hence the first spool 60, in the unwinding direction.

The seated child or an attending vehicle occupant will also move the second section 32 of the webbing 22 a slight amount when locking the second tongue 46 in the buckle 26. Such movement of the second section 32 also will include slight additional amounts of both retraction and extraction. The slight additional retraction causes the second clutch disk 114 to rotate with the second spool 62 in the clockwise direction from the position of FIG. 7 to the position of FIG. 8. As a result, the upper lug 146 moves away from the second locking pawl 96 in the clockwise direction. The second clutch disk 114 thus directs the second locking pawl 96 to move pivotally into the space between the upper and lower lugs 146 and 148 under the influence of the second spring arm 180. The second locking pawl 96 is then located in the locked position in which it blocks further movement of the ratchet teeth 98, and hence the second spool 62, in the unwinding direction.

As noted above, both of the locking tongues 40 and 46 are unlocked and released from the buckle 26 upon manual depression of the release button 54 on the buckle 26. The first and second sections 30 and 32 of the webbing 22 are then released from the positions shown in FIG. 1, and are free to be retracted into the retractor 24 by the rewind springs in the spring cover 90 (FIG. 2). The rewind springs then rotate the first and second spools 60 and 62 in their winding directions, and the cinch mechanism 110 reverts from the cinched condition of FIG. 8 to the initial condition of FIG. 5. Specifically, each of the count disks 230 and 232 rotates with its respective spool 60 or 62 in its winding direction and, through its respective count pin 242, rotates its respective count wheel 234 or 236 back from the position of FIG. 8 to the position of FIG. 5. The first and second abutment pins 252 and 262 on the count wheels 234 and 236 then move against the first and second abutment wall portions 198 and 216 of the links 172 and 174, respectively, to move the links 172 and 174 back from the positions of FIG. 8 to the positions of FIG. 5. The links 172 and 174 then return the first and second locking pawls 92 and 96 to the initial positions of FIG. 5 against the forces of the first and second spring arms 178 and 180, respectively. The links 172 and 174 also move against the clutch pins 154 and 130 on the clutch disks 114 and 112, respectively, and thus rotate the clutch disks 114 and 112 back to the initial positions of FIG. 5. Such rotation of the clutch disks 114 and 112 is stopped by contact of the arms 144 and 116 with the lower stop surfaces 158 and 124, respectively.

Figure 9:
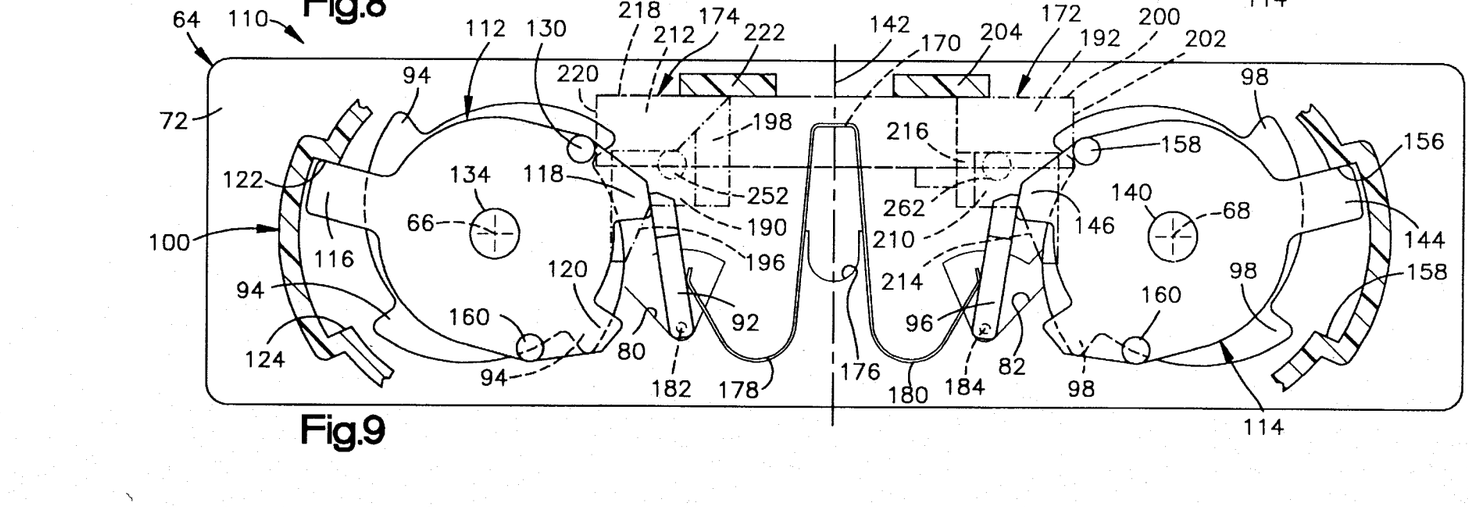
FIG. 9 is a view similar to FIG. 7 showing parts of the retractor in positions taken at yet another stage of operation of the retractor.

A vehicle occupant may alternatively extract the first and second sections 30 and 32 of the webbing 22 from the retractor 24 simultaneously rather than sequentially. Therefore, as another example of the manner in which the cinch mechanism 110 operates, FIG. 9 illustrates a stage reached in the operation of the cinch mechanism 110 when the first and second sections 30 and 32 of the webbing 22 are extracted from the retractor 24 simultaneously. Specifically, FIG. 9 illustrates an intermediate condition taken by the cinch mechanism 110 when the two sections 30 and 32 of the webbing 22 have been extracted simultaneously.

The intermediate condition of the cinch mechanism 110 that is shown in FIG. 9 differs from the intermediate condition shown in FIG. 7 in that the first locking pawl 92 is held in its intermediate position by the upper lug 118, rather than the lower lug 120, on the first clutch disk 112. This is because the first clutch disk 112 begins to rotate with the first spool 60 in the clockwise direction immediately when the first spool 60 begins to rotate in its unwinding direction. The first clutch disk 112 thus rotates in the clockwise direction from the position of FIG. 5 toward the position of FIG. 9 immediately upon unwinding rotation of the first spool 60, and is stopped in the position of FIG. 9 upon contact of the arm 116 with the upper stop surface 122 on the cover 100. Such immediate rotation of the first clutch disk 112 with the first spool 60 is enabled by the second link 174 as the second link 174 moves from the position of FIG. 5 toward the position of FIG. 9 upon simultaneous unwinding rotation of the second spool 62. The simultaneous unwinding rotation of the second spool 62 causes the second clutch disk 114 to reach the position shown in FIG. 9 in the same manner as described above with reference to FIG. 7 and sequential unwinding rotation of the second spool 62.

Any subsequent winding rotation of the second spool 62 upon subsequent retracting movement of the second section 32 of the webbing 22 will cause the second clutch disk 114 to rotate back in the clockwise direction from the position of FIG. 9 to the position of FIG. 8. The first clutch disk 112 will rotate back in the counterclockwise direction from the position of FIG. 9 to the position of FIG. 8 when the first spool 60 subsequently rotates in the winding direction upon any subsequent retracting movement of the first section 30 of the webbing 22. The first and second clutch disks 112 and 114 thus direct the first and second locking pawls 92 and 96 to move from their intermediate positions to their locked positions in response to subsequent retracting movements of the first and second sections 30 and 32 of the webbing 22 following simultaneous extraction of the first and second sections 30 and 32 from the retractor 24.

From the above description of the invention, those skilled in the art will perceive improvements, changes and modifications. For example, the retractor 24 could alternatively be mounted in the back of a vehicle seat to control first and second sections of seat belt webbing that have ends anchored in the cushion of the seat. Such improvements, changes and modifications within the skill of the art are intended to be covered by the appended claims.

Having described the invention, the following is claimed:

1. Apparatus comprising:

a first spool having means for supporting a first section of seat belt webbing on said first spool;

means for supporting said first spool for winding and unwinding rotation;

a second spool having means for supporting a second section of seat belt webbing on said second spool;

means for supporting said second spool for winding and unwinding rotation; and cinch means for blocking unwinding rotation of both of said spools when said cinch means is actuated, said cinch means initially being unactuated so as to permit unwinding rotation of both of said spools prior to completion of a predetermined amount of unwinding rotation of both of said spools, said predetermined amount of unwinding rotation corresponding with extraction of said first and second sections of seat belt webbing from initial, fully retracted positions on said spools, said cinch means being actuated in response to completion of said predetermined amount of unwinding rotation of both of said spools independently of vehicle deceleration.

2. Apparatus as defined in claim 1 further comprising a vehicle seat and a frame supported on said vehicle seat, said frame comprising said means for supporting said first spool, said frame further comprising said means for supporting said second spool.

3. Apparatus as defined in claim 2 wherein said frame is supported on a cushion portion of said vehicle seat.

4. Apparatus comprising:

a first spool having means for supporting a first section of seat belt webbing;

means for supporting said first spool for winding and unwinding rotation;

a second spool having means for supporting a second section of seat belt webbing;

means for supporting said second spool for winding and unwinding rotation; and cinch means for blocking unwinding rotation of said spools independently of vehicle deceleration, said cinch means blocking unwinding rotation of said first spool in response to a first amount of rotation of said spools which includes a predetermined amount of unwinding rotation of said second spool, said cinch means blocking unwinding rotation of said second spool in response to a second amount of rotation of said spools which includes a predetermined amount of unwinding rotation of said first spool.

5. Apparatus as defined in claim 4 wherein said first amount of rotation of said spools includes initial unwinding rotation of said first spool, followed by said predetermined amount of unwinding rotation of said second spool, and further followed by subsequent unwinding rotation of said first spool.

6. Apparatus as defined in claim 5 wherein said cinch means includes a movable locking pawl having an initial position, an intermediate position, and a locked position in which said pawl blocks unwinding rotation of said first spool, said cinch means moving said pawl from said initial position to said intermediate position in response to said initial unwinding rotation of said first spool, said cinch means further moving said pawl from said intermediate position to said locked position in response to said subsequent unwinding rotation of said first spool.

7. Apparatus as defined in claim 4 wherein said second amount of rotation of said spools includes said predetermined amount of unwinding rotation of said first spool, followed by unwinding rotation of said second spool, and further followed by winding rotation of said second spool.

8. Apparatus as defined in claim 7 wherein said cinch means includes a movable locking pawl having an initial position, an intermediate position, and a locked position in which said pawl blocks unwinding rotation of said second spool, said cinch means moving said pawl from said initial position to said intermediate position in response to said unwinding rotation of said second spool, said cinch means further moving said pawl from said initial position to said locked position in response to said winding rotation of said second spool.

9. Apparatus as defined in claim 4 wherein said first amount of rotation of said spools includes unwinding rotation of said first spool simultaneously with said predetermined amount of unwinding rotation of said second spool, and further includes subsequent winding rotation of said first spool.

10. Apparatus as defined in claim 9 wherein said cinch means includes a movable locking pawl having an initial position, an intermediate position, and a locked position in which said pawl blocks unwinding rotation of said first spool, said cinch means moving said pawl from said initial position to said intermediate position in response to said unwinding rotation of said first spool, said cinch means further moving said pawl from said intermediate position to said locked position in response to said subsequent winding rotation of said first spool.

11. Apparatus as defined in claim 4 wherein said second amount of rotation of said spools includes unwinding rotation of said second spool simultaneously with said predetermined amount of unwinding rotation of said first spool, and further includes subsequent winding rotation of said second spool.

12. Apparatus as defined in claim 4 further comprising a vehicle seat and a frame supported on said vehicle seat, said frame comprising said means for supporting said first spool, said frame further comprising said means for supporting said second spool.

13. Apparatus as defined in claim 12 wherein said frame is supported on a cushion portion of said vehicle seat.

14. Apparatus comprising:

a first spool having means for supporting a first section of seat belt webbing on said first spool;

means for supporting said first spool for winding and unwinding rotation;

a second spool having means for supporting a second section of seat belt webbing on said second spool;

means for supporting said second spool for winding and unwinding rotation; and cinch means for blocking unwinding rotation of said spools, said cinch means blocking unwinding rotation of said first spool in response to a first amount of rotation of said spools which includes a predetermined amount of unwinding rotation of said second spool, said cinch means blocking unwinding rotation of said second spool in response to a second amount of rotation of said spools which includes a predetermined amount of unwinding rotation of said first spool;

said cinch means comprising a first movable locking pawl having a first locked position in which said first pawl blocks unwinding rotation of said first spool, a second movable locking pawl having a second locked position in which said second pawl blocks unwinding rotation of said second spool, first clutch means for enabling movement of said first pawl into said first locked position in response to rotation of said first spool when said first clutch means is enabled, second clutch means for enabling movement of said second pawl into said second locked position in response to rotation of said second spool when said second clutch means is enabled, first link means for enabling said second clutch means in response to rotation of said first spool, and second link means for enabling said first clutch means in response to rotation of said second spool.

15. Apparatus as defined in claim 14 further comprising spring means for biasing said first and second pawls respectively toward said first and second locked positions, said spring means comprising a spring member having a first spring arm biasing said first pawl toward said first locked position and a second spring arm simultaneously biasing said second pawl toward said second locked position.

16. Apparatus as defined in claim 14 wherein said first link means enables said second clutch means in response to at least a predetermined amount of unwinding rotation of said first spool, said second link means enabling said first clutch means in response to at least a predetermined amount of unwinding rotation of said second spool.

17. Apparatus as defined in claim 14 wherein said first clutch means includes a first rotatable clutch member which is supported to rotate with said first spool when said first clutch means is enabled, said first clutch member being rotatable into and out of a position in which said first clutch member blocks movement of said first pawl into said first locked position, said second clutch means including a second rotatable clutch member which is supported to rotate with said second spool when said second clutch means is enabled, said second clutch member being rotatable into and out of a position in which said second clutch member blocks movement of said second pawl into said second locked position.

18. Apparatus as defined in claim 17 wherein said first link means blocks rotation of said second clutch member with said second spool prior to rotation of said first spool, said first link means releasing said second clutch member to rotate with said second spool in response to rotation of said first spool, said second link means blocking rotation of said first clutch member with said first spool prior to rotation of said second spool, said second link means releasing said first clutch member to rotate with said first spool in response to rotation of said second spool.

19. Apparatus as defined in claim 18 wherein said first link means includes a first movable link member having a first blocking position in which said first link member blocks rotation of said second clutch member with said second spool, said first link member being movable into and out of said first blocking position in response to rotation of said first spool, said second link means including a second movable link member having a second blocking position in which said second link member blocks rotation of said first clutch member with said first spool, said second link member being movable into and out of said second blocking position in response to rotation of said first spool.

20. Apparatus as defined in claim 14 further comprising a vehicle seat and a frame supported on said vehicle seat, said frame comprising said means for supporting said first spool, said frame further comprising said means for supporting said second spool.

21. Apparatus as defined in claim 20 wherein said frame is supported on a cushion portion of said vehicle seat.

22. Apparatus comprising:

a first spool having means for supporting a first wound length of seat belt webbing on said first spool;

means for supporting said first spool for winding and unwinding rotation;

a second spool having means for supporting a second wound length of seat belt webbing on said second spool;

means for supporting said second spool for winding and unwinding rotation; and cinch means for blocking unwinding rotation of said spools, said cinch means blocking unwinding rotation of said first spool in response to a first amount of rotation of said spools which includes a predetermined amount of unwinding rotation of said second spool, said cinch means blocking unwinding rotation of said second spool in response to a second amount of rotation of said spools which includes a predetermined amount of unwinding rotation of said first spool;

said first amount of rotation of said spools including initial unwinding rotation of said first spool, followed by said predetermined amount of unwinding rotation of said second spool, and further followed by subsequent unwinding rotation of said first spool;

said cinch means including a movable locking pawl having an initial position, an intermediate position, and a locked position in which said pawl blocks unwinding rotation of said first spool, said cinch means moving said pawl from said initial position to said intermediate position in response to said initial unwinding rotation of said first spool, said cinch means further moving said pawl from said intermediate position to said locked position in response to said subsequent unwinding rotation of said first spool;

said cinch means further including spring means for biasing said pawl toward said locked position, link means for holding said pawl in said initial position prior to said initial unwinding rotation of said first spool and for releasing said pawl for movement to said intermediate position in response to said initial unwinding rotation of said first spool, and clutch means for holding said pawl in said intermediate position during said predetermined amount of unwinding rotation of said second spool and for releasing said pawl for movement to said locked position in response to said subsequent unwinding rotation of said first spool.

23. Apparatus as defined in claim 22 further comprising a vehicle seat and a frame supported on said vehicle seat, said frame comprising said means for supporting said first spool, said frame further comprising said means for supporting said second spool.

24. Apparatus as defined in claim 23 wherein said frame is supported on a cushion portion of said vehicle seat.

25. Apparatus comprising:

a first spool having means for supporting a first wound length of seat belt webbing on said first spool;

means for supporting said first spool for winding and unwinding rotation;

a second spool having means for supporting a second wound length of seat belt webbing on said second spool;

means for supporting said second spool for winding and unwinding rotation; and cinch means for blocking unwinding rotation of said spools, said cinch means blocking unwinding rotation of said first spool in response to a first amount of rotation of said spools which includes a predetermined amount of unwinding rotation of said second spool, said cinch means blocking unwinding rotation of said second spool in response to a second amount of rotation of said spools which includes a predetermined amount of unwinding rotation of said first spool;

said second amount of rotation of said spools including said predetermined amount of unwinding rotation of said first spool, followed by unwinding rotation of said second spool, and further followed by winding rotation of said second spool;

said cinch means including a movable locking pawl having an initial position, an intermediate position, and a locked position in which said pawl blocks unwinding rotation of said second spool, said cinch means moving said pawl from said initial position to said intermediate position in response to said unwinding rotation of said second spool, said cinch means further moving said pawl from said initial position to said locked position in response to said winding rotation of said second spool;

said cinch means further including spring means for biasing said pawl toward said locked position, link means for holding said pawl in said initial position during said predetermined amount of unwinding rotation of said first spool and for releasing said pawl for movement to said intermediate position in response to said unwinding rotation of said second spool, and clutch means for holding said pawl in said intermediate position prior to said winding rotation of said second spool and for releasing said pawl for movement to said locked position in response to said winding rotation of said second spool.

26. Apparatus as defined in claim 25 further comprising a vehicle seat and a frame supported on said vehicle seat, said frame comprising said means for supporting said first spool, said frame further comprising said means for supporting said second spool.

27. Apparatus as defined in claim 26 wherein said frame is supported on a cushion portion of said vehicle seat.

28. Apparatus comprising:

a first spool having means for supporting a first wound length of seat belt webbing on said first spool;

means for supporting said first spool for winding and unwinding rotation;

a second spool having means for supporting a second wound length of seat belt webbing on said second spool;

means for supporting said second spool for winding and unwinding rotation; and cinch means for blocking unwinding rotation of said spools, said cinch means blocking unwinding rotation of said first spool in response to a first amount of rotation of said spools which includes a predetermined amount of unwinding rotation of said second spool, said cinch means blocking unwinding rotation of said second spool in response to a second amount of rotation of said spools which includes a predetermined amount of unwinding rotation of said first spool;

said first amount of rotation of said spools including unwinding rotation of said first spool simultaneously with said predetermined amount of unwinding rotation of said second spool, and further including subsequent winding rotation of said first spool;

said cinch means including a movable locking pawl having an initial position, an intermediate position, and a locked position in which said pawl blocks unwinding rotation of said first spool, said cinch means moving said pawl from said initial position to said intermediate position in response to said unwinding rotation of said first spool, said cinch means further moving said pawl from said intermediate position to said locked position in response to said subsequent winding rotation of said first spool;

said cinch means including spring means for biasing said pawl toward said locked position, link means for holding said pawl in said initial position prior to said unwinding rotation of said first spool and for releasing said pawl for movement to said intermediate position in response to said unwinding rotation of said first spool, and clutch means for holding said pawl in said intermediate position prior to said subsequent winding rotation of said first spool and for releasing said pawl for movement to said locked position in response to said subsequent winding rotation of said first spool.

29. Apparatus as defined in claim 28 further comprising a vehicle seat and a frame supported on said vehicle seat, said frame comprising said means for supporting said first spool, said frame further comprising said means for supporting said second spool.

30. Apparatus as defined in claim 29 wherein said frame is supported on a cushion portion of said vehicle seat.

31. Apparatus comprising:

a first spool having means for supporting a first wound length of seat belt webbing;

means for supporting said first spool for winding and unwinding rotation;

a second spool having means for supporting a second wound length of seat belt webbing;

means for supporting said second spool for winding and unwinding rotation;

a first movable locking pawl having a first locked position in which said first pawl blocks unwinding rotation of said first spool;

a second movable locking pawl having a second locked position in which said second pawl blocks unwinding rotation of said second spool;

first clutch means for enabling movement of said first pawl into said first locked position in response to rotation of said first spool when said first clutch means is enabled;

second clutch means for enabling movement of said second pawl into said second locked position in response to rotation of said second spool when said second clutch means is enabled;

first link means for enabling said second clutch means in response to rotation of said first spool; and second link means for enabling said first clutch means in response to rotation of said second spool.

32. Apparatus as defined in claim 31 further comprising spring means for biasing said first and second pawls respectively toward said first and second locked positions, said spring means comprising a spring member having a first spring arm biasing said first pawl toward said first locked position and a second spring arm simultaneously biasing said second pawl toward said second locked position.

33. Apparatus as defined in claim 31 wherein said first link means enables said second clutch means in response to at least a predetermined amount of unwinding rotation of said first spool, said second link means enabling said first clutch means in response to at least a predetermined amount of unwinding rotation of said second spool.

34. Apparatus as defined in claim 31 wherein said first clutch means includes a first rotatable clutch member which is supported to rotate with said first spool when said first clutch means is enabled, said first clutch member being rotatable into and out of a position in which said first clutch member blocks movement of said first pawl into said first locked position, said second clutch means including a second rotatable clutch member which is supported to rotate with said second spool when said second clutch means is enabled, said second clutch member being rotatable into and out of a position in which said second clutch member blocks movement of said second pawl into said second locked position.

35. Apparatus as defined in claim 34 wherein said first link means blocks rotation of said second clutch member with said second spool prior to rotation of said first spool, said first link means releasing said second clutch member to rotate with said second spool in response to rotation of said first spool, said second link means blocking rotation of said first clutch member with said first spool prior to rotation of said second spool, said second link means releasing said first clutch member to rotate with said first spool in response to rotation of said second spool.

36. Apparatus as defined in claim 35 wherein said first link means includes a first movable link member having a first blocking position in which said first link member blocks rotation of said second clutch member with said second spool, said first link member being movable into and out of said first blocking position in response to rotation of said first spool, said second link means including a second movable link member having a second blocking position in which said second link member blocks rotation of said first clutch member with said first spool, said second link member being movable into and out said second blocking position in response to rotation of said first spool.

37. Apparatus as defined in claim 31 further comprising a vehicle seat and a frame supported on said vehicle seat, said frame comprising said means for supporting said first spool, said frame further comprising said means for supporting said second spool.

38. Apparatus as defined in claim 37 wherein said frame is supported on a cushion portion of said vehicle seat.

* * * * *